United States Patent [19]

Nudelman et al.

[11] 4,204,878

[45] May 27, 1980

[54] RAW MIXTURE FOR THE PRODUCTION OF REFRACTORY HIGH-ALUMINA CEMENT

[75] Inventors: Boris I. Nudelman; Marsel Y. Bikbau; Pavel A. Oborin, all of Tashkent; Tamara V. Kuznetsova, Moscow, all of U.S.S.R.

[73] Assignee: Tashkentsky Nauchnoissledovatelsky I Proektny Institut Stroitelnykh Materialov "Niistromproekt", U.S.S.R.

[21] Appl. No.: 958,501

[22] Filed: Nov. 7, 1978

Related U.S. Application Data

[63] Continuation of Ser. No. 804,265, Jun. 7, 1977, abandoned.

[30] Foreign Application Priority Data

Aug. 20, 1976 [SU] U.S.S.R. .............................. 2400198

[51] Int. Cl.² .............................................. C04B 7/32
[52] U.S. Cl. ................................................... 106/104
[58] Field of Search ........................................ 106/104

[56] References Cited

U.S. PATENT DOCUMENTS

| | | | |
|---|---|---|---|
| 1,716,527 | 6/1929 | Martin | 106/104 |
| 3,826,664 | 7/1974 | Grylicki et al. | 106/104 |

FOREIGN PATENT DOCUMENTS 4330062 12/1968 Japan ...................................... 106/104

*Primary Examiner*—O. R. Vertiz
*Assistant Examiner*—Mark Bell
*Attorney, Agent, or Firm*—Robert E. Burns; Emmanuel J. Lobato; Bruce L. Adams

[57] ABSTRACT

A raw mixture is provided for the production of a refractory high-alumina cement which consists of a calcareous component, an aluminous component and a chloride of at least one of the metals selected from the group consisting of magnesium, calcium, barium, strontium, sodium, potassium; the components are present in the raw mixture in the following amounts, percent by mass: aluminous component (calculated for $Al_2O_3$): 69 to 73 calcareous component (calculated for CaO): 11 to 23 chlorides of said metals: 20 to 4.

9 Claims, No Drawings

RAW MIXTURE FOR THE PRODUCTION OF REFRACTORY HIGH-ALUMINA CEMENT

This is a continuation of application Ser. No. 804,265, filed 6/7/77, now abandoned.

BACKGROUND OF THE INVENTION

The present invention relates to the production of cement and, more specifically, to a raw mixture for the production of a high-alumina refractory cement adapted to be used in the manufacture of refractories.

Known in the art is a raw mixture for the production of a refractory aluminous cement containing lime and an aluminous component.

To produce cement from this mixture, the latter is subjected to calcination at a temperature within the range of from 1,500° to 1,550° C., which is associated with considerable power consumption and the necessity of using calcination furnaces provided with a high-refractory lining.

Also known in the art is a raw mixture for the production of a refractory aluminous cement which incorporates a commercial alumina, calcium oxide and minor amounts of silica and iron oxide, the components being taken in the following proportions, percent by mass:
Commercial alumina: 72 to 75
Calcium oxide: 22 to 25
silica and iron oxide: below 2

This raw mixture enables the production of a high-alumina refractory cement with a predominant content of calcium dialuminate ensuring the cement refractoriness up to 1,760° C.

Refractory cements based on this mixture are produced by calcination of the latter at a temperature within the range of from 1,500° to 1,550° C. in rotating furnaces which is also associated with considerable heat consumption and an accelerated wear of the refractory lining.

SUMMARY OF THE INVENTION

It is an object of the present invention to provide a composition of a raw mixture for the production of a refractory high-alumina cement which enable calcination of said raw mixture at substantially lower temperatures.

It is another object of the present invention to provide a raw mixture for the production of a refractory high-alumina cement which can be calcined in furnaces without the use of any special-purpose high-refractory lining.

It is still another object of the present invention to improve the quality of a cement produced from the raw mixture according to the present invention and to lower the existing requirements as to the purity of the starting materials for the production of said cement.

These and other objects of the present invention are accomplished by a raw mixture for the production of a refractory high-alumina content cement containing a calcareous component and an aluminous component as the main components, and in accordance with the present invention also includes a chloride of at least one of the following metals: magnesium, calcium, barium, strontium, sodium, potassium, the components being taken in the following proportions, percent by mass:
aluminous component (calculated for $Al_2O_3$): 69 to 73
calcareous component (calculated for $CaO$): 11 to 23
chlorides of said metals: 20 to 4.

DESCRIPTION OF THE INVENTION

As the aluminous component use should preferably be made of commercial alumina; as the calcareous component it is preferably to employ, for example, commercial calcium carbonate, limestone. The latter should be preferably used with a minimal content of impurities. Chlorides of the above-mentioned metals (catalytic additives) might be added into the raw mixture either separately or in a combination with each other. These additives intensify the clinker-formation process, since the presence thereof in the raw mixture ensures formation of a liquid phase which serves as a reaction medium already at a temperature within the range of from 700° to 900° C. The reaction mixture comprises salt melts of chlorides of magnesium, calcium, barium, strontium, containing dissolved starting components. Incorporation of chlorides of the above-mentioned metals makes it possible to substantially lower the temperature of clinker-formation which, according to the present invention, is effectively performed within the range of from 1,000° to 1,300° C.

Formation of clinker occurs effectively enough with the use of all of the above-mentioned chlorides, though from the economic standpoint it is advisable to use more readily available and less expensive chlorides of calcium, magnesium potassium and sodium.

Proportions of the components in the raw mixture according to the present invention are selected so as to ensure a predominating content of calcium dialuminate in the final product since this component is responsible for the refractory properties of the final cement.

The amount of chlorides in the raw mixture is defined by the required content of calcium dialuminate in the final product and by technology of the raw mixture calcination. Thus, when a calcination temperature is varied within the range of from 1,000° to 1,100° C., a greater amount of chlorides is taken (15 to 20% by mass), while at a calcination temperature of from 1,200° to 1,300° C. said chlorides are taken in an amount ranging from 5 to 10% by mass.

The raw mixture according to the present invention makes it possible to lower the calcination temperature by 300° to 350° C. as compared to raw mixtures containing no catalytic additives. This enables a substantial decrease in energy consumption as well as a lowered specific consumption rate of the fuel for the clinker calcination.

The raw mixture containing chlorides in accordance with the present invention makes it possible to produce a refractory high-alumina cement in furnaces provided with a refractory lining and to extend the service life of thermal units.

A clinker produced from the raw mixture according to the present invention features a higher millability (by 1.2–1.5 times) as compared to those of the prior art, whereby the power consumption for grinding of the clinker becomes substantially reduced.

Furthermore, calcination of the raw mixture containing chlorides according to the present invention makes it possible to substantially bring down the existing limitations imposed on the purity grade of the starting components, due to elimination of contaminating compounds during calcination.

The raw mixture according to the present invention makes it possible to improve the cement quality (i.e. increase its refractoriness or activity) due to enhanced purity thereof.

The process for producing the raw mixture according to the present invention is performed in the following manner.

The starting components are ground either in a mixture or separately with the subsequent intermixing thereof.

Grinding and intermixing of the starting components taken in appropriate amounts is performed following the dry method, wherein all the components are introduced into a grinding unit in the dry form either in a mixture or separately; said grinding and blending of the starting components can be also performed by the dry method, wherein water or an aqueous solution of the chlorides employed is added in an amount of from 25 to 35% by mass to prepare a slurry of the starting components. To obtain a granulated material, the dry mixture is added with 6 to 9% by mass of water or an aqueous solution of the chlorides.

A metered and homogenized dry raw mixture or a granulated material or a slurry is further delivered into a calcination unit, wherein the material is calcined at a temperature within the range of from 1,000° to 1,300° C.

The resulting clinker can contain a predetermined amount of the residual chlorides. After calcination the clinker is cooled and ground to obtain a required fineness of the final cement particles.

For a better understanding of the present invention the following specific Examples are given hereinbelow by way of illustration.

EXAMPLE 1

A raw mixture is prepared for the production of a refractory aluminous cement having the following composition, percent by mass:
commercial alumina (calculated for $Al_2O_3$): 73
limestone (calculated for CaO): 16
calcium chloride: 11.

The commercial alumina is ground by the wet method to a residue of at most 10% by mass on a sieve with the hole diameter of 63 mcm. To grind the alumina, a 36% (by mass) aqueous solution of calcium chloride is added thereto. The resulting aluminous slurry is mixed with a calcareous slurry prepared by grinding the limestone to a residue of 10% by mass on a sieve with a hole diameter of 63 mcm. The thus-prepared slurry is dried and granulated to particles with a size of from 5 to 20 mm. The granulated material is calcined in a rotary furnace with the diameter of 0.5 m (in the clear) and length of 6 m at a temperature of from 1,000° to 1,000° C. till the clinker-formation is completed which is controlled by the absence of the noncombined calcium oxide.

The resulting clinker comprises, mainly, calcium dialuminate. Besides, it contains 5 to 10% by mass of calcium monoaluminate.

The clinker is ground to a residue of at most 10% by mass on a sieve with the hole diameter of 63$\mu$. The thus-produced cement has the following properties:
compression strength, $kgf/cm^2$:
  after one day: 290
  after 3 days: 515
  refractoriness, °C.: 1,750° C.

EXAMPLE 2

A raw mixture for the production of a refractory aluminous cement is prepared from the following components, percent by mass;
commercial alumina (calculated for $Al_2O_3$): 73
aqueous magnesium chloride (calculated for MgO): 4
lime (calculated for CaO): 23.

The commercial alumina is ground alongside the limestone in a 12–13% aqueous solution of magnesium chloride to a residue of at most 10% by mass on a sieve with a hole diameter of 63 mcm; the resulting slurry has a humidity content of from 35 to 35% by mass.

The thus-prepared slurry is fed into a rotary furnace, wherein it is atomized within the furnace zone having temperature of from 1,000° to 1,100° C. Thereafter, the material is moved to the following zone of the furnace having a temperature of from 1,100° to 1,200° C.

The resulting clinker consists by 80–85% of calcium dialuminate. The clinker is cooled and ground to a residue of at most 7% by mass on a sieve with a hole diameter of 63$\mu$.

The final cement has the following properties:
compression strength, $kgf/cm^3$:

after one day: 250
  after three days: 475
  refractoriness, °C.: 1,700.

EXAMPLE 3

A raw mixture for the production of a refractory aluminous cement having the following composition (percent by mass) is prepared:
commercial alumina (calculated for $Al_2O_3$): 69
calcium chloride: 15
potassium chloride: 4
sodium chloride: 1
commercial calcium carbonate (calculated for CaO): 11.

The commercial alumina is ground and blended with the commercial calcium carbonate and dry chlorides of said metals to a residue of at most 10% by mass on a sieve with a hole diameter of 63$\mu$.

The resulting raw flour is heated to a temperature of from 400° to 500° C. and calcined in a suspended condition in a calcination unit at a temperature of from 1,100° to 1,200° C. until the complete binding of CaO. Control of free calcium oxide is performed by the ethyl-glycerate method.

The thus-produced clinker is cooled and ground to a residue of 5% by mass on a sieve with a hole diameter of 63 mcm.

The final cement has the following properties:
compression strength, $kgF/cm^2$:
  after one day: 245
  after three days: 435
  refractoriness, °C.: 1,730.

EXAMPLE 4

A raw mixture is prepared for the production of a refractory aluminous cement having the following composition, percent by mass:
commercial alumina (calculated for $Al_2O_3$): 71
sodium chloride: 8
limestone (calculated for CaO): 21.

The commercial alumina is ground and blended with the limestone in a manner similar to that described in the foregoing Example 2.

The resulting slurry of the raw mixture is dried, granulated and calcined in a manner described in the foregoing Example 1.

The thus-prepared clinker comprises mainly calcium dialuminate (about 90% by mass). The clinker is ground to a residue of 10% by mass on the sieve with a hole diameter of 63$\mu$.

The final cement has the following properties:
compression strength, kgf/cm$^2$:
 after one day: 245
 after three days: 480
refractoriness, °C.: 1,730° C.

EXAMPLE 5

A raw mixture is prepared for the production of a refractory aluminous cement having the following composition, percent by mass:
commercial alumina (calculated for Al$_2$O$_3$): 71
limestone (calculated for CaO): 21
sodium chloride: 3.4
potassium chloride: 4.6

The raw mixture is prepared following the procedure described in Example 1 hereinbefore. The granulated material is dried and heated to a temperature within the range of from 550° to 600° C., and then calcined in a thermal unit at a temperature within the range of from 1,100° to 1,200° C.

The resulting clinker is cooled and ground to a residue of at most 7% by mass on a sieve with a hole diameter of 63μ. The final cement has the following properties:
compression strength, kgf/cm$^2$:
 after one day: 255
 after three days: 500
refractoriness, °C.: 1.740.

EXAMPLE 6

A raw mixture is prepared for the production of a refractory aluminous cement having the following composition, percent by mass:
commercial alumina (calculated for Al$_2$O$_3$): 69
limestone (calculated for CaO): 11
calcium chloride: 20.

The raw mixture is prepared and calcined following the procedure described in the foregoing Example 1. The resulting clinker is cooled and ground to a residue of at most 7% by mass on a sieve with a hole diameter of 63μ. The final cement has the following characteristics:
compression strength, kgf/cm$^2$:
 after one day: 260
 after three days: 510
refractoriness, °C.: 1,730.

EXAMPLE 7

A raw mixture for the production of a refractory aluminuous cement is prepared with the following composition, percent by mass:
commercial alumina (calculated for Al$_2$O$_3$: 71
barium chloride: 6
potassium chloride: 2
sodium chloride: 2
limestone (calculated for CaO): 19.

The raw mixture is prepared and calcined following the procedure described in Example 2 hereinbefore. The resulting clinker is cooled and ground to a residue of at most 7% by mass on a sieve with a hole diameter of 63 mcm. The final cement has the following characteristics:
compression strength, kgf/cm$^2$:
 after one day: 285
 after three days: 530
refractoriness, °C.: 1,725.

EXAMPLE 8

A raw mixture is prepared for the production of a refractory aluminous cement having the following composition, percent by mass:
commercial alumina (calculated for Al$_2$O$_3$): 70
limestone (calculated for CaO): 18
strontium chloride: 12.

The raw mixture is prepared and calcined following the procedure described in the foregoing Example 3. The thus-prepared clinker is cooled and ground to a residue of at most 7% by mass on a sieve with a hole diameter of 63μ. The final cement has the following characteristics:
compression strength, kgf/cm$^2$:
 after one day: 285
 after three days: 530
refractoriness, °C.: 1,740.

What is claimed is:

1. A raw mixture for the production of a refractory high-alumina cement consisting of a calcareous component, an aluminous component and a chloride of at least one metal, selected from the group consisting of magnesium, calcium, barium, strontium, sodium, potassium, the components being taken in the following proportions, percent by mass;
aluminuous component (calculated for Al$_2$O$_3$): 69 to 73
calcareous component (calculated for CaO): 11 to 23
chlorides of said metals: 20 to 4.

2. A raw mixture according to claim 1, in which said metal is selected from the group consisting of calcium, magnesium, potassium and sodium and said aluminous component consists of commercial alumina.

3. A raw mixture according to claim 1 in which the proportion of said aluminous and calcareous components and said metal chlorides is such as to ensure during calcination of the raw mixture of a temperature of about 1000°-1300° C., the elimination of compounds which contaminate the cement product.

4. A raw mixture according to claim 1 in which the proportion of said aluminous and calcareous components and said metal chlorides is such as to ensure a predominating content of calcium dialuminate in the product obtained by calcination of said raw mixture and the elimination of contaminating compounds during calcination, when calcination is carried out at a temperature of about 1000°-1300° C.

5. A raw mixture according to claim 1 in which the proportion of said aluminous and calcareous components and said metal chloride is such as to ensure a content of calcium dialuminate of about 80 to 90% by mass in the product obtained by calcination of said raw mixture at a temperature of 1000°-1300° C.

6. A raw mixture according to claim 1 in which the proportion of said aluminous and calcareous component and said metal chlorides is such as to provide cement having a predominating content of calcium dialuminate, and wherein the final cement has a compression strength after 1 day of hardening of about 245–290 kgf./cm.$^2$ and after 3 days of hardening about 435–530 kgf./cm.$^2$ and a refractoriness of about 1700°–1750° C., when said raw mixture is calcined at a temperature of about 1000°-1300° C.

7. A method of producing a high refractory cement having a predominate content of calcium dialuminate comprising calcining the raw mixture defined in claim 1 at a temperature of about 1000° to 1300° C., the proportions of the aluminous and calcareous components and said metal chlorides being such as to ensure the elimination of contaminating compounds during calcination, wherein the calcination temperature is at the high part of said temperature range when the amount of said metal chlorides is in the low part of its range of proporation and the calcination temperature is at the low part of the temperature range when said metal chlorides is in the high part of its range of proportion.

8. A method of producing high refractory cement according to claim 7 in which the temperature of calcining varies inversely with the proportion of metal chlorides in said raw mixture, so that said calcination temperature is about 1000°–1100° C. when said raw mixture contains about 15–20% by mass of said chlorides and said calcination temperature is about 1200°–1300° C. when said raw mixture contains up to about 10% by mass of said chlorides.

9. A raw mixture according to claim 1 which consists essentially of $Al_2O_3$ in an amount of 69–73%, a calcareous component, calculated for CaO, in an amount of 11 to 23% selected from the group consisting of calcium carbonate lime and limestone and a chloride of at least one said metal chloride in an amount of 20 to 4%.

* * * * *